April 27, 1926.

G. W. VAN BLARCOM

FISHING POLE ATTACHMENT

Original Filed March 12, 1923

1,582,196

Inventor

Glen W. Van Blarcom

Patented Apr. 27, 1926.

1,582,196

UNITED STATES PATENT OFFICE.

GLEN W. VAN BLARCOM, OF LANSING, MICHIGAN.

FISHING-POLE ATTACHMENT.

Application filed March 12, 1923, Serial No. 624,519. Renewed November 25, 1925.

*To all whom it may concern:*

Be it known that I, GLEN W. VAN BLARCOM, a citizen of the United States, residing at Lansing, in the county of Ingham and State of Michigan, have invented certain new and useful Improvements in a Fishing-Pole Attachment, of which the following is a specification.

This invention relates to attachments for fishing poles and has for its prime object to provide novel means for fastening a fishing line to a fishing pole not equipped with a reel.

A further object of my invention is to provide means whereby a fishing line attached to the end of a fishing pole may have the free end or the end containing the hooks and sinkers easily and quickly attached to the pole adjacent the handle of same, so that the pole and line may be carried without having to wind the line around the pole, which often results in the line becoming tangled and difficult to unwind, and in addition thereto presents a very untidy appearance.

A still further object of my invention is to provide an attachment for fishing poles of the above indicated character, which is simple in construction, durable, efficient for the purpose intended, and one that can be manufactured and placed on the market at a low cost.

These and like objects of the invention will be better understood as the description follows.

Referring to the accompanying drawing which forms a part of this specification—

Referring to the accompanying drawing in detail, like characters will be used to designate like parts in the different views.

Figure 1:
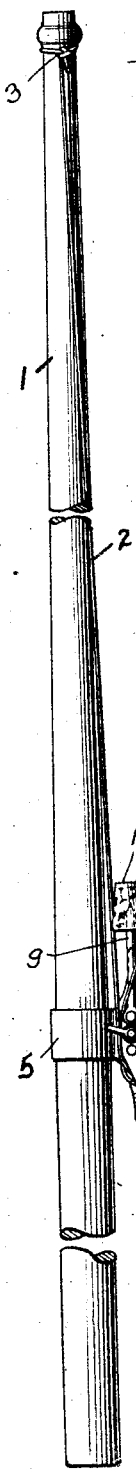
Figure 1 is a perspective view of a fish pole showing my invention applied thereto.
Figure 2:
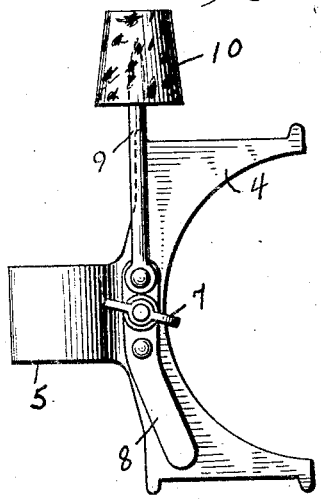
Figure 2 is a side elevation of my invention detached from the fish pole.
Figure 3:
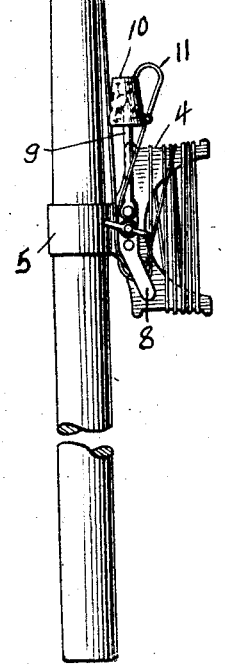
Figure 3 is an end view of same with the cork removed.

In the drawing, the numeral 1 indicates a fishing pole, which can be of the usual construction, and 2 designates a fishing line, one end of which is secured in any suitable manner to the end of the pole 1 as at 3.

Usually when a fishing line is used in connection with a pole not equipped with a reel, it is customary to wind the line around the pole when not using same in the act of fishing, which as above stated results in the line becoming tangled and difficult to unwind therefrom. To overcome these objections, I have designed my invention, which comprises a flat plate 4 upon which the line 2 is adapted to be wound when said line is not in use, said plate having a clamp 5 formed on one edge which is adapted to engage the fishing pole 1 adjacent the handle end of same and being securely held on by means of a bolt and thumb screw 7.

A spring clip 8 is secured to the face of the member 4 by means of the two rivets, so that the fishing line 2 may be held in a taut position between the end of the pole and its engagement with the reel or plate 4. After the line 2 has been slipped under the spring clip 8, the portion of the line containing the hooks and sinkers is wound around the member 4 as is clearly indicated in Figure 1.

A shank 9 is attached to one end of the member 8 and has a cork 10 mounted thereon, so that the fish hook 11 may be secured in the said cork, thus preventing same from coming in contact with the person carrying said pole.

In view of the foregoing description of my invention taken in connection with the accompanying drawing, it is thought that any further explanation as to the construction, operation, and objects of this invention are unnecessary.

While I have shown and described the preferred form of my fishing pole attachment, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In combination with a fishing pole and fishing line, a flat plate upon which the line is adapted to be wound, a clamp carried by said plate for engagement with said pole, and a hook receiving member carried by said plate for holding the hook.

2. In combination with a fishing pole and fishing line, a plate upon which said line is adapted to be wound, means for attaching said plate to said pole, a clip carried by said plate for engagement with said line, a shank carried by said plate, and a member upon the outer end of said shank for receiving a hook carried by said line.

In testimony whereof, I have affixed my signature.

GLEN W. VAN BLARCOM.